United States Patent
Gupta et al.

(10) Patent No.: US 10,713,039 B2
(45) Date of Patent: Jul. 14, 2020

(54) LINGUISTIC SEMANTIC ANALYSIS APPLICATION INTEGRATION SYSTEM

(71) Applicant: Dell Products L.P., Round Rock, TX (US)

(72) Inventors: Arunava Das Gupta, Bangalore (IN); Vaideeswaran Ganesan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/971,772

(22) Filed: May 4, 2018

(65) Prior Publication Data

US 2019/0339968 A1    Nov. 7, 2019

(51) Int. Cl.

| | |
|---|---|
| *G06F 9/44* | (2018.01) |
| *G06F 8/76* | (2018.01) |
| *G06F 8/30* | (2018.01) |
| *G06F 9/54* | (2006.01) |
| *G06F 9/445* | (2018.01) |
| *G06F 16/33* | (2019.01) |
| *G06F 40/30* | (2020.01) |
| *G06F 40/205* | (2020.01) |

(52) U.S. Cl.
CPC .................. *G06F 8/76* (2013.01); *G06F 8/30* (2013.01); *G06F 9/44521* (2013.01); *G06F 9/54* (2013.01); *G06F 16/3344* (2019.01); *G06F 40/205* (2020.01); *G06F 40/30* (2020.01)

(58) Field of Classification Search
None
See application file for complete search history.

(56) References Cited

U.S. PATENT DOCUMENTS

2016/0321039 A1* 11/2016 Chaudhuri ................ G06F 8/51

OTHER PUBLICATIONS

"DreamFactory Features—Rest API Automation and API Management Made Simple: DreamFactory is the Easiest Way to Automatically Generate, Publish, and Manage REST APIs", 2018, 16 Pages, DreamFactory Software Inc., https://www.dreamfactory.com/features.

* cited by examiner

*Primary Examiner* — Qamrun Nahar
(74) *Attorney, Agent, or Firm* — Haynes and Boone, LLP

(57) ABSTRACT

A linguistic semantic analysis application integration system includes an application and one or more linguistic semantic analysis databases that include application-specific programming language information that identifies application-specific programming language terms utilized in providing the application. A linguistic semantic analysis engine is provided a module to be utilized by the application, and operates to analyze the module to determine methods and properties included in the module. The methods and properties are then parsed to identify library programming language terms included in the methods and properties, and those library programming language terms are matched with the application-specific programming language terms included in the application-specific programming language information. Based on that matching, intent for the methods and properties is determined, and that intent is used to automatically generate integration code for integrating the module with the application.

19 Claims, 4 Drawing Sheets

LINGUISTIC SEMANTIC ANALYSIS APPLICATION INTEGRATION SYSTEM

BACKGROUND

The present disclosure relates generally to information handling systems, and more particularly to the use of linguistic semantic analysis to integrate applications for use with information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage devices, networking devices, and/or other computing devices, utilize applications that interact with the hardware and software in the computing devices. However, the integration of applications for use with computing devices raises some issues. For example, a computing device manufacturer may integrate applications with their computing devices that monitor the hardware and software in those computing devices, which typically involves identifying the systems management artifacts developed for the hardware (e.g., Management Information Bases (MIBs), Common Management Information (CMI) profiles, JavaScript Object Notation (JSON) schemas, Representational State Transfer (REST) interfaces, Application Programming Interfaces (APIs), etc.), and write code that integrates those system management artifacts with the applications. However, such activities are time intensive, as significant effort is involved in understanding and analyzing the meaning of elements utilized by the system management artifacts. Furthermore, requests for application integration are frequent, and the time intensive process discussed above prevents many of those requests from being satisfied. Further still, even when such requests are filled, integrating applications to operate with current computing device firmware is associated with the same issues, and thus even integrated applications will quickly fail to operate with all available firmware functionality. Providing support for new computing device products presents similar issues, as even when a computing device product is provided with a library (e.g., a Python or Powershell library), application integration requires those libraries be studied to understand the meaning of their terms, and write "glue" logic to integrate them to operate with those applications.

For example, development operations (devops) software such as, for example, Ansible software available at www.ansible.com and SaltStack software available at www.saltstack.com, provide for the integration of a variety of application modules with that devops software. Conventionally, computing device manufacturers develop plug-ins for those application modules (and maintain those plug-ins) "by hand" via RESTful/Web Services Management (WSMan) interfaces provided by the computing device or the Python/Powershell/Java libraries utilized by the computing device. Disruptions (new software, product phase-out, etc.), changes in devops software roadmaps, and continuous development of dependent components typically requires a team of engineers to continually sustain and keep support for the application modules up to date.

Accordingly, it would be desirable to provide for improved integration of applications for use with computing devices.

SUMMARY

According to one embodiment, an Information Handling System (IHS) includes a processing system; and a memory system that is coupled to the processing system and that includes instructions that, when executed by the processing system, cause the processing system to provide a linguistic semantic analysis engine that is configured to: analyze a module that is to be utilized with an application; determine, based on analyzing of the module, methods and properties included in the module; parse the methods and properties to identify library programming language terms included in the methods and properties; match the library programming language terms included in the methods and properties with the application-specific programming language terms that are included in application-specific programming language information that is stored in one or more linguistic semantic analysis databases; determine, based on the matching of the library programming language terms with the application-specific programming language terms, intent for the methods and properties; and automatically generate, based on the determination of the intent for the methods and properties, integration code for integrating the module with the application.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
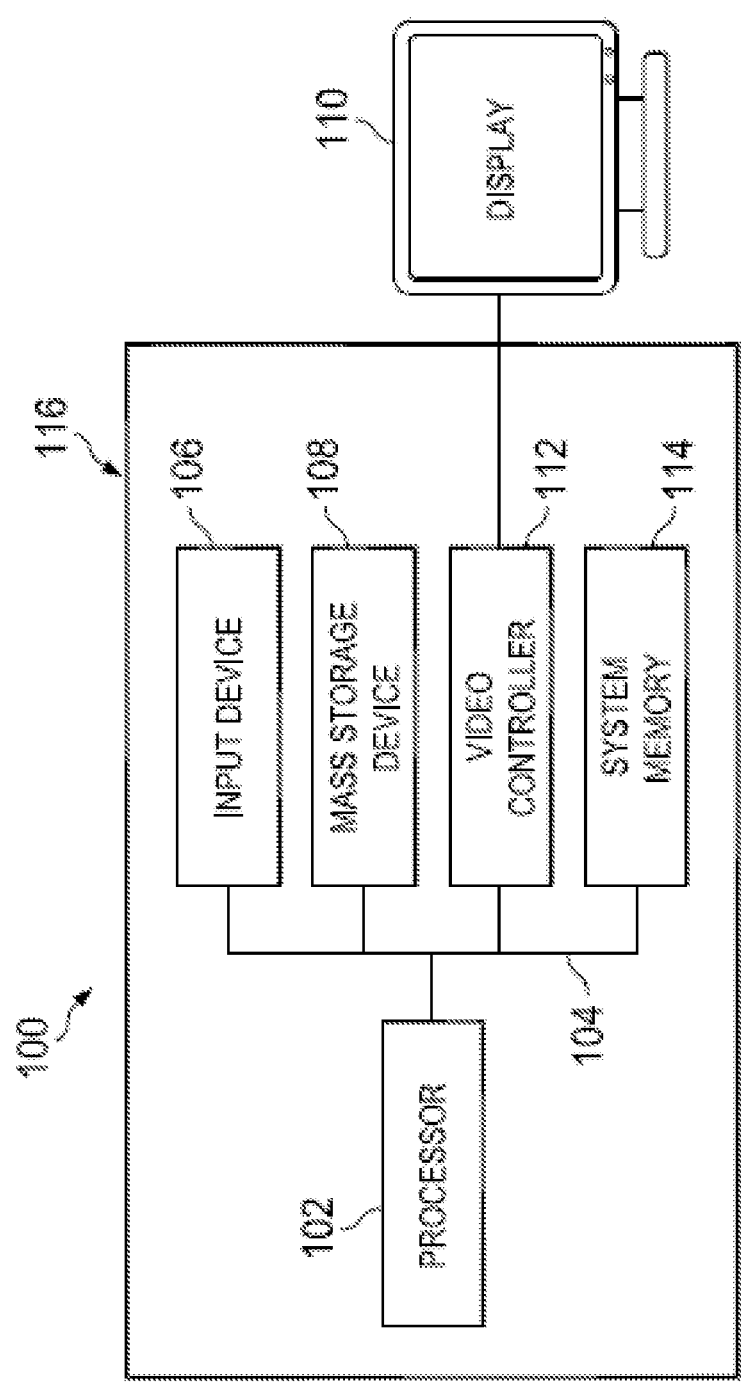
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
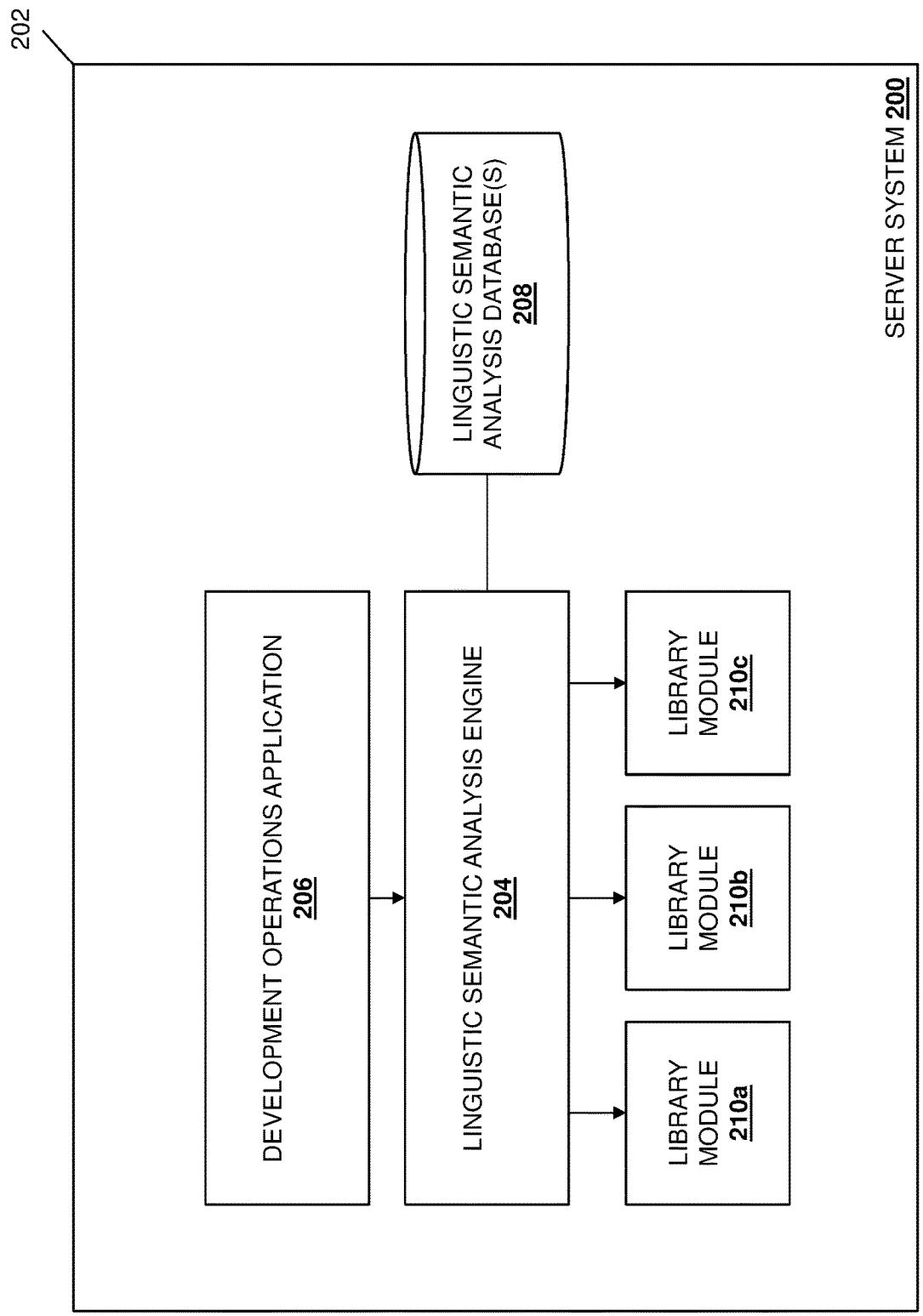
FIG. 2 is a schematic view illustrating an embodiment of a server system.

Referring now to FIG. 2, an embodiment of a server system 200 is illustrated. In an embodiment, the server system 200 may be provided by the IHS 100 discussed above with reference to FIG. 1, or may include some or all of the components of the IHS 100. In a specific embodiment, the server system 200 is provided by a single server device, although multiple server devices may provided the server system while remaining within the scope of the present disclosure as well. In the illustrated embodiment, the server system 200 includes a chassis 202 that houses the components of the server system 200, only some of which are illustrated in FIG. 2. For example, the chassis 202 may house a processing system (not illustrated, but which may include the processor discussed above with reference to FIG. 1) and a memory system (not illustrated, but which may include the memory 114 discussed above with reference to FIG. 1) that includes instructions that, when executed by the processing system, cause the processing system to provide a linguistic semantic analysis engine 204 that is configured to perform the functions of the linguistic semantic analysis engines and/or server systems discussed below.

The chassis 202 may also house a memory system (not illustrated, but which may include the memory 114 discussed above with reference to FIG. 1) that includes a development operations application 206. As would be understood by one of skill in the art, development operations is a software engineering culture and practice that aims at unifying software development and software operation to shorten application development cycles, increase application deployment frequency, and provide more dependable application releases. Thus, while a variety of applications may benefit from the teachings of the present disclosure, the systems and methods described herein have been found to provide particular benefits for development operations applications that are released faster and more frequently that other types of applications. In a specific example, development operations applications may include Ansible software, SaltStack software, and/or a variety of other devops software that would be apparent to one of skill in the art in possession of the present disclosure.

The chassis 202 may also house a storage system (not illustrated, but which may include the storage device 108 discussed above with reference to FIG. 1) that includes one or more linguistic semantic analysis databases 208. As discussed below, the linguistic semantic analysis database(s) 208 may include application-specific programming language information that identifies application-specific programming language terms utilized in providing the development operations application 206. In an embodiment, the linguistic semantic analysis database(s) 208 may include a domain-specific dictionary with nouns (or noun combinations) and verbs that are specific to a domain or other target system that is managed by the development operations application 206. For example, such a domain or target system may include the integrated Dell Remote Access Controller (iDRAC) available from DELL®, Inc. of Round Rock, Tex., United States. However, one of skill in the art in possession of the present disclosure will recognize that other domains or target systems will fall within the scope of the present disclosure as well. In a specific example, the domain-specific library may include noun or noun combinations such as "server configuration profile", "server profile", "factory inventory", "virtual disk", "physical disk", "light emitting device (LED)", "share", "credentials", "username", "password", "provisioning array", "fast policy", and/or other nouns that one of skill in the art in possession of the present disclosure will recognize may be included in the domain-specific library to identify each possible physical and logical entity belonging to the target system or domain. In another specific example, the domain-specific library may include verbs such as "export", "import", "create", "modify", "delete", "set", "find", "get", "blink", "unblink", "process", and/or other verbs that one of skill in the art in possession of the present disclosure will recognize may be included in the domain-specific library to identify each possible operation that may be performed by, via, and/or on the entities in the target system or domain (i.e., the nouns discussed above.)

In an embodiment, the linguistic semantic analysis database(s) 208 may include domain-specific component trees and/or other computing device information that identifies components in a domain or target system that is configured to execute the development operations application 206. For example, for a server that is configured to execute the development operations application 206, the component tree may include "processor-memory-Redundant Array of Independent Disks (RAID)-system-iDRAC", while for a provisioning array that is configured to execute the development operations application 206, the component tree may include "volume-pool". In an embodiment, the linguistic semantic analysis database(s) 208 may include a domain-specific thesaurus that may include synonyms, antonyms, and state cycles. In a specific example, synonyms in the domain-specific thesaurus may include "set=modify=change=configure", "get=find", and "delete=remove". In a specific example, antonyms in the domain-specific thesaurus may include "export-import", "create-delete", and "blink-unblink". In a specific example, state cycles in the domain-specific thesaurus may include "create-get-set-delete", "blink-unblink", and/or any other possible sequence of operations (i.e., the verbs discussed above) that may be performed by entities (e.g., the nouns discussed above) in the target system or domain. In addition, the domain-specific thesaurus may include direction information for its included terms. For example, such direction information may indicate that terms such as "import", "set", and "create" are provided to the domain or target system, while terms such as "export", "get", and "find" are provided from the domain or target system. One of skill in the art in possession of the present disclosure will recognize that some terms (e.g., "process") may not have any direction information.

In an embodiment, the linguistic semantic analysis database(s) 208 may include a domain-specific resource dictionary that may include the final types or methods that connect to a domain or target system resource, which one of skill in the art in possession of the present disclosure will recognize may be specific to the programming language used to write the development operations application 206. In an embodiment, the linguistic semantic analysis database(s) 208 may include an acronym dictionary that identifies terms that are often shortened by users in library APIs or method arguments. For example, terms like "Server Config Profile", "Srvr Cnfgrtn Prfl", and "Srvr CnFg Prfl" for a Server Configuration Profile, or "Mgmt" for Management, or "Mgr" for Manager. One of skill in the art in possession of the present disclosure will recognize that acronyms may be provided by a system vendor, or may be generated using several techniques know in the art such as, for example, removing vowels from individual words, removing all syllables except the first syllable in an individual word, retaining only a few consonants (e.g., the first three) in any individual words, etc. In an embodiment, the linguistic semantic analysis database(s) 208 may include a potential names dictionary that may combine terms included in the domain-specific dictionary and the acronym dictionary. For example, potential names may include "srvrCnfgPrfl", serverConfigProfile", "server_config_profile", and "srvr_cnfg_prfl". While several specific examples of linguistic semantic analysis database information has been described, one of skill in the art in possession of the present disclosure will recognize that any terms and/or information utilized in the development operations application and/or the domain/target system that executes it, may be included in the linguistic semantic analysis database(s) 208 while remaining within the scope of the present disclosure.

The chassis 202 may also house a plurality of library modules 210a, 210b, and 210c. As discussed in further detail below, the library modules 210a, 210b, and 210c may represent modules that are to be utilized with the development operations application 206 when it is executed on the domain/target system. As such, the library modules 210a-c may include updates, releases, and/or other modifications that are to be integrated into the development operations application 206. As discussed in further detail below, the linguistic sematic analysis engine 204 utilizes the linguistic semantic analysis database(s) 208, and in some cases the development operations application itself, to integrate the library modules 210a-c for use with the development operations application by any domain for which domain-specific information has been provided in the linguistic semantic analysis database(s) 208. While a specific server system has been described, one of skill in the art in possession of the present disclosure will understand that server systems may include a variety of other components and/or component configurations for providing conventional server system functionality, as well as the functionality discussed below, while remaining within the scope of the present disclosure.

Figure 3:
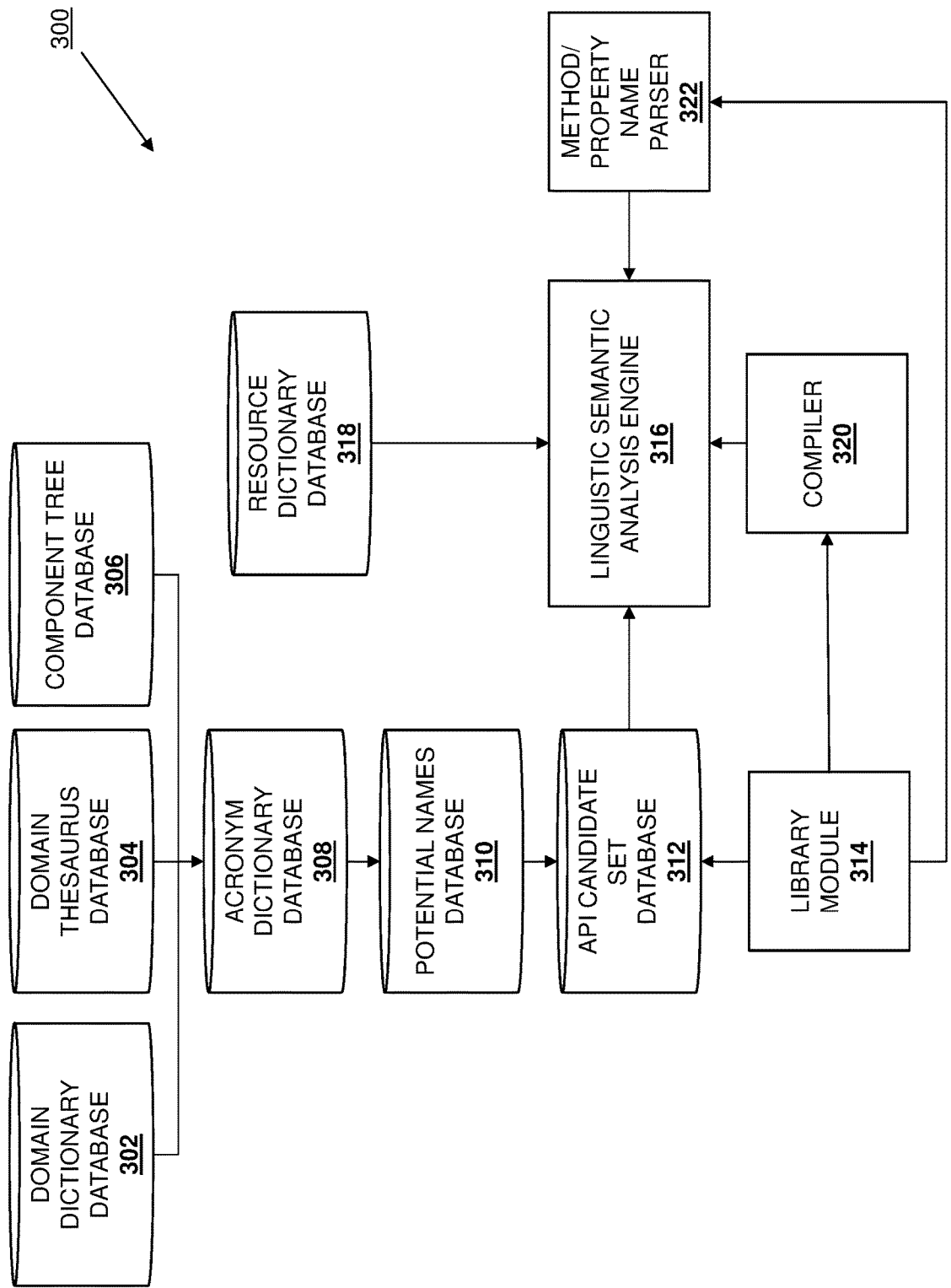
FIG. 3 is a schematic view illustrating the server system of FIG. 2.

Referring now to FIG. 3, an embodiment of a server system 300 is illustrated that may be the server system 200 discussed above with reference to FIG. 1, and is provided for discussion in the examples below. As can be seen, each of a domain dictionary database 302, a domain thesaurus database 304, and a component tree database 306 may be considered in light of an acronym dictionary database 308 and a potential names database 310 in order to create an API candidate set database 312 from a library module 314. A linguistic semantic analysis engine 316 may access the API candidate set database 312 and a resource dictionary database 318, and receive library module information that has been passed through a compiler 320 and a method/property name parser 322 in order to perform the linguistic semantic analysis discussed below.

Figure 4:
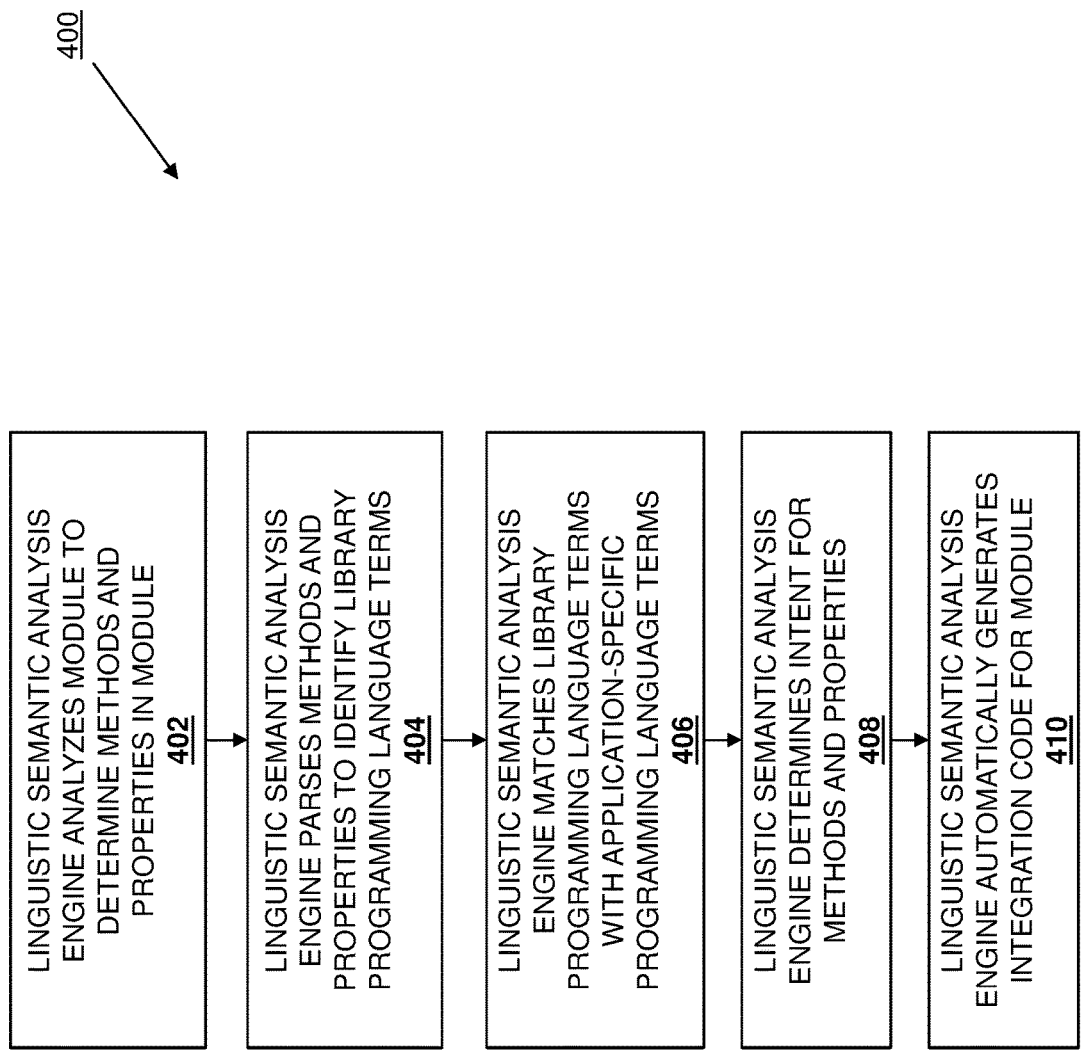
FIG. 4 is a flow chart illustrating an embodiment of a method for integrating applications using linguistic semantic analysis.

Referring now to FIG. 4, an embodiment of a method 400 for integrating applications using linguistic semantic analysis is illustrated. As discussed below, the systems and methods of the present disclosure provide for the integration of modules into devops applications via the use of dictionaries and thesauruses that identify the semantics utilized in the domain/target system in order to perform linguistic semantic analysis on the module and the application that allows for the mapping of the module into the application with content awareness. The systems and methods of the present disclosure eliminate the need for "hand-coding" and the associated maintenance of modules that is necessary for their integration into applications in order to keep the applications up-to-date with regard to their operation in the domain/target system.

In an embodiment, prior to the method 400 of the illustrated embodiment, the linguistic semantic analysis database(s) 208 may be provided with the information discussed above with reference to FIG. 2. For example, a computing device manufacturer (i.e., of a computing device/domain/target system that is to execute the development operations application 206) may provide the information in the domain-specific dictionary database 302, the domain-specific thesaurus database 304, the domain-specific component tree database 306, the acronym dictionary database 308, the potential names database 310, the resource dictionary database 318, and/or any of the other databases discussed above. As such, the computing device manufacturer may provide the nouns, noun-combinations, and verbs that define a domain-specific dictionary in the domain-specific dictionary database 302. In addition, the computing device manufacturer may provide the synonyms, antonyms, state-cycles, and direction information that define a domain-specific thesaurus in the domain-specific thesaurus database 304. Furthermore, the computing device manufacturer may provide the component trees and/or other computing device information that defines a domain-specific component trees in the domain-specific component tree database 306. Further still, the computing device manufacturer may provide the acronyms that define an acronym dictionary in the acronym dictionary database 308, or those acronyms may be generated using the techniques discussed above. Further still, the computing device manufacturer may provide the potential names that define a potential names dictionary in the potential names database 310. Further still, the computing device manufacturer may provide the resources that define a resource dictionary in the resource dictionary database 318. However, while specific information is described herein, one of skill in the art in possession of the present disclosure will recognize that the linguistic semantic analysis database(s) 208 may be provided with any information about a domain/target system/computing device that is to be managed by the development operations application 206.

The method 400 begins at block 402 where a linguistic semantic analysis engine analyzes a module to determine methods and properties included in that module. In an embodiment, at block 402, the linguistic semantic analysis engine 204 may analyze any of the library modules 210a, 210b, and 210c that are to be integrated with the development operations application 206 for use with a domain/target system/computing device, and determine methods and properties included in that library module 210a, 210b, and/or 210c. For example, the linguistic semantic analysis engine 204/316 may operate at block 402 to build an API candidate set of methods, properties, and public classes that are included in the library module 210a/314 by accessing and loading the dictionaries, thesauruses, and/or other information (e.g., RESTful and ESDL interface definitions), and utilizing any or all of that information to collect and prepare API candidate sets from the methods, properties, and public classes that are included in the library module 210a/314. The linguistic semantic analysis engine 204/316 may then store those API candidate sets in the API candidate set database 312. In an embodiment, any publically exposed methods and/or public properties of a public class in the library may be considered as an API candidate set. For example, a library that communicates with an IDRAC may have methods such as "connect( )", "disconnect( )", "reset( )", "reset to factory defaults( )", "upgrade firmware( )", "import scp( )", and "export scp( )". In addition, such methods and/or properties may be exposed to devops software via integration code. As such, the candidate sets of APIs may be extracted by loading the library, scanning through a symbol table, and extracting methods and/or properties that are recorded as public by a library developer.

The method 400 then proceeds to block 404 where the linguistic semantic analysis engine parses methods and properties to identify library programming language terms. In an embodiment, at block 404, the linguistic semantic analysis engine 204 may parse the methods and properties determined for any of the library modules 210a, 210b, and 210c at block 402 in order to identify library programming language terms included in those methods and properties. For example, the linguistic semantic analysis engine 204/316 may operate at block 404 to parse the methods and properties determined for the library module 210a/314 at block 402 to determine the names utilized for those methods and properties by splitting the method and property names into library programming language terms. In a specific example, such library programming language terms included in the method and property names may be identified by reversing the Hungarian notations utilized in the method and property names, splitting the library programming language terms included in the method and property names when a underscore ("_") is identified, and/or using other techniques that would be apparent to one of skill in the art in possession of the present disclosure. As such, a method such as "import_scp( )" may be split into "import" and "scp", while a property such as "BootMode" may be split into "Boot" and "Mode".

In some specific examples of block 404, the method/property "connect( )" may result in the identification of library programming language term "connect". Similarly, the method/property "newIdracConnection( )" may result in the identification of library programming language terms that provide for a "new connection to the iDRAC", as Hungarian notation requires that all English words representing a function be combined into a single function name with a first character of every English word capitalized, and the linguistic semantic analysis engine 204/316 may include logic that provides for the identification of the original English words by splitting the function name (newIdracConnection) at each capital character boundary—new, Idrac and Connection. Similarly, the method/property "remove_virtual_drive" may result in the identification of library programming language terms "remove virtual drive", as Python builds function names by combining the English words using '_' and making all of them as lower case, and the linguistic semantic analysis engine 204/316 may include logic to identify the original English words by splitting the function name by '_' (remove, virtual, drive). Similarly, the function name "import_scp" may be identified as "import" "scp", where "scp" is acronym for Server Configuration Profile. One of skill in the art in possession of the present disclosure will recognize that the above techniques for forming function names is almost universally used in the industry. However, other conventions followed in a library may be utilized at block 404 while remaining within the scope of the present disclosure as well.

The method 400 then proceeds to block 406 where the linguistic semantic analysis engine matches the library programming language terms with application-specific programming language terms. In an embodiment, at block 406, the linguistic semantic analysis engine 204 may match the library programming terms identified in the methods and properties determined for any of the library modules 210a, 210b, and 210c with application-specific programming language terms stored in the linguistic semantic analysis database(s) 208. For example, the linguistic semantic analysis engine 204/316 may operate at block 406 to match the library programming terms identified in the methods and properties determined for the library module 210a with any of the information included in the linguistic semantic analysis database(s) 208. In a specific example, the linguistic semantic analysis engine 204 may operate match library programming terms in methods to nouns and verbs in the domain-specific dictionary database 302 based on the assumption that methods typically include combinations of nouns and verbs, and may match library programming terms in properties to nouns, noun combinations, and resource references in the domain-specific dictionary database 302 and the resource dictionary database 318 based on the assumption that properties typically include nouns/noun combinations and references to resources, which allows the linguistic semantic analysis engine 204 to ignore other parts of speech (e.g., prepositions, conjunctions, etc.) used in the identified methods and properties. Continuing the example discussed above, the method "import_scp( )" that was split into "import" and "scp" at block 404 may further be defined as "import" and "server configuration profile" via the use of the acronym dictionary in the acronym dictionary database 308 to identify "scp" as an acronym for "server configuration profile".

In an embodiment of block 406, the linguistic semantic analysis engine 204 may look up individual words identified in a method or property in the noun, verb, and acronym dictionaries. In the event those words are not found, they may be looked up in the thesaurus as either synonyms or antonyms (which one of skill in the art in possession of the present disclosure will recognize will typically occur with verbs). In the event those words are still not found, combination of the words in the order in which they were identified may be looked up in the dictionaries. For example, a search for 'Virtual', 'Drive' and 'Virtual Drive' may be performed, but no search for 'Drive Virtual' will be conducted because it is not defined in the function name in that order. If the words are still not found, the linguistic semantic analysis engine 204 may determine that the word does not exist, and in some cases may identify the function as undecipherable.

In a specific example, the method/property "Import_scp( )" may be split at block 406 into 'import' and 'scp'. 'Import' may then be looked up in the noun, verb, and/or acronym dictionary, and will be found in the verb dictionary in this example. 'Scp' may then be included in the noun, verb and/or acronym dictionary, and may instead be found in acronym dictionary in this example, which then points to the noun dictionary to identify the term 'Server Configuration Profile'. In another specific example, the method/property "RemoveVirtualDrive( )" may be split at block 406 into "Remove", "Virtual", and "Drive". "Remove" will be found in the verb dictionary, but "Virtual" and "Drive" may be not be found in any of the noun, verb, and acronym dictionary in this example. However, "Virtual Drive" may be found in the noun dictionary in this example. In another specific example, the method property "UnblinkPhysicalDrive( )" may be split at block 406 into "Unblink", "Physical", and "Drive", with "Unblink" found in the verb dictionary, but "Physical" and "Drive" not found in any of the noun, verb, or acronym dictionary. However, "Physical Drive" may be found in the noun dictionary in this example. In another specific example, "DeleteVirtualDrive( )" may be split at block 406 into "Delete", "Virtual", and "Drive", and "Delete" may not be not found in any of the noun, verb or acronym dictionary. However, "Delete" may be found as a synonym for "Remove" in the Thesaurus, and while "Virtual" and "Drive" may not found in any of the noun, verb, or acronym dictionary, but "Virtual Drive" may be found in the noun dictionary in this example.

The method 400 then proceeds to block 408 where the linguistic semantic analysis engine determines intent for the methods and properties. In an embodiment, at block 408, the linguistic semantic analysis engine 204 may utilize the processing of the methods and properties for any of the library modules 210a, 210b, and 210c that was performed at blocks 402, 404, and/or 406 to determine an intent for those methods and properties. For example, the linguistic semantic analysis engine 204/316 may operate at block 408 to utilize method and properties names determined for the methods and properties in the library module 210a/314, along with information in the linguistic semantic analysis database(s) 208, to determine the intent of the methods and properties included in the library module 210a/314.

In a specific example, the intent of methods may be determined by performing the parsing discussed above, with the words resulting from the parsing then looked up in the verb dictionary, and the verbs associated with the functions extracted. Using the examples above of "remove_virtual_drive( )" and "import_scp( )", the verbs "remove" and "import", respectively, may be extracted in this example. Those extracted words are then looked up in the Thesaurus to find the synonyms, antonyms, direction attributes, and state cycle attributes, as illustrated in the table below:

| Verb | Synonym | Antonym | Direction Attributes |
|---|---|---|---|
| remove | delete, purge | create, new, add | Destructor |
| create | New, add | Remove, delete, purge | Constructor |
| import | | export | Import, ← object |
| export | | import | Export, → object |

One of skill in the art in possession of the present disclosure will recognize that there may be relatively few direction attributes. For example, direction attributes may include "constructor" (identifying the creation of an object), "Destructor" (identifying the deletion of an object), "Modifier" (identifying the modification of the full or partial state of an object or its properties), "Getter" (identifying the retrieval of a full or partial state of an object or its properties), "Import→ device" (representing bulk modification of a device), "Export← device" (representing the extraction of information from an object), "Connect" (representing the connection to a device), and "Disconnect" (representing the disconnection from a device). In an embodiment, methods which do not follow the above properties may be classified as "Generic", and the intent of the method may not be known (but may be determined by parsing the module as described below.) In an embodiment, the intent of the properties may always be either "Getter" or "Modifier", and may be determined by the context. For example, in the "Getter" context, a value may be retrieved from the property, whereas in the "Modifier" context, a value may be updated into the property.

In a specific example of the method 400, the library module 210a/314 may include a Python module, a Powershell module, a Java module, and/or a variety of other modules that would be apparent to one of skill in the art in possession of the present disclosure. During the method 400, the library module 210a/314 may be parsed to determine library programming terms included in the library module 210a/314 by, for example, loading the library module 210/314 (e.g., a Python module) into the method/property name parser 322 (e.g., a Python parser). Methods, properties, and public classes in the library module 210a/314 may then be identified utilizing, for example, a reflection API. As would be understood by one of skill in the art, within a public classis, object properties and derived classes may be identified as well. In an embodiment, the method/property name parser 322 may be provided by a language specific parser (e.g., a Python parser, a Java parser, etc.) that understands the grammar of the specific language (e.g., a parser that implements the grammar.) In that parser, the library modules may be loaded (e.g., one after another), and the parser will convert the representation of the module code into a tree data structure (also called parse tree) that is semantically similar to the original library. With the parse tree, the context of the variables may be identified. For example, variables which are in the modification context (e.g., to the left of an assignment expression or pass-by-reference context, where the variable values are being modified) are considered L-values. In another example, variables in the getter context (e.g., to the right of an assignment expression or pass-by-value context, where variable values are being retrieved) are considered R-values. Furthermore, expressions involving object constructors or object destructors may be labeled as constructors and destructors, respectively.

In an embodiment, the API candidate sets determined and stored in the API candidate set database 312 may be analyzed for R-values and L-values. For example, if a method or property in the library module 210a/314 includes an object property with an L-value, the object associated with that object property is modified by that method or property. In another example, if a method or property in the library module 210a/314 includes an object property with an R-value and the linguistic semantic analysis engine 204/316 is able to trace that object property to a return variable or an out variable, the object associated with that object property is returned by that method or property. Furthermore, in situations where sub-methods are utilized in the library module 210a/314, further analysis may be conducted on the method/sub-method to determine a class for the method/sub-method that will enable traversing through virtual functions. When traversing through virtual functions, the linguistic semantic analysis engine 204/316 may tag class properties that are impacted by the method/sub-method such as, for example, to indicate that only a portion (e.g., "users") of a "class iDRAC" is impacted when users are added to the "class iDRAC", as compared to how "import SCP" would impact all parts of the "class iDRAC". In an embodiment, the intent of the method may be determined based on the direction attributes discussed above. For example, a method may be identified as a constructor or destructor based on the context of its variables, and if the method is not classified as a constructor or destructor, then the method may be classified as a modifier or getter based on the majority of variables in that modifier or getter context. In a specific example, if there are 10 constructor calls and 5 destructor calls, the method may be identified as a constructor, while if there are 10 getter calls, then the method may be identified as a getter. Furthermore, if there are 6 modifier calls and 3 getter calls, then the method may be identified as a modifier. Similarly, properties may be classified as a modifier or getter based on context as well.

In an embodiment, the information in the domain-specific component tree database 306 may be utilized to validate the structure. For example, the component tree database may include a list of components and how they are contained within other components, and the names of those components may be found in the noun dictionary. In a specific example, a server or iDRAC may contain a list of drives, network interface cards, processors, memory modules, power supply units, fans, flash drives, and/or other components that would be apparent to one of skill in the art in possession of the present disclosure. Furthermore, the class definitions of iDRAC may contain properties which are used to represent the above artifacts. For example, a class "iDRAC" may contain a class "Drive", class "Network Interface Card", a class "Processor", a class "Memory Module", a class "Power Supply", a class "Fan", a class "Flash Drives", and/or other classes that would be apparent to one of skill in the art in possession of the present disclosure. The names may then be found in the noun dictionary that match the component tree database correspond to the classes found in the corresponding class.

In an embodiment, if a method or property includes a reference to system resource such as "file open" or "db connection", that information may be interpreted by the linguistic semantic analysis engine 204 as a valid state of the system, and methods and properties that access system resources may be tagged. For example, in the parse tree of "newIDRACConnection( )" library code, a network socket connection may be opened to connect to the device, and may be construed as a "Connection" API. Similarly, in the parse tree of "closeiDRACConnection( )" library code, a network socket connection may be closed, and may be construed as a "Disconnect" API In an embodiment, the linguistic semantic analysis engine 204 may determine whether the methods and properties result in return values. For example, methods often return an integral status code or an entity, and that knowledge can be utilized to determine the status returned by the function. For example, most Python functions return "null", or a Boolean value of "False", or an empty string in order to indicate a failure. Furthermore, Python functions may return a non-zero value, a Boolean value "True", or a valid string to indicate a success. As such, based on the return value, it may be determined whether the function was successful or not.

As such, one of skill in the art in possession of the present disclosure will recognize how, following block 408, the methods and properties in the library module 210a/314 that impact particular aspects of objects and/or properties utilized by the domain/target system/computing device may be determined.

The method 400 then proceeds to block 410 where the linguistic semantic analysis engine automatically generates integration code for the module. In an embodiment, at block 410, the linguistic semantic analysis engine 204 may utilize the intent determined for the methods and properties for any of the library modules 210a, 210b, and/or 210c to automatically generate integration code for that module. For example, at block 410, the linguistic semantic analysis engine 204 may utilize the intent determined for the methods and properties of the library module 210a/314 in order to generate integration code for that library module 210a/314 in order to integrate the library module 210a/314 with the development operations application 206. With the above context, integration code may then be generated.

In a specific example, integration code may be generated as follows. Using the example, including the API "import_scp( )", the above processes will identify it as providing for the importing of a server configuration profile, and providing for the importation of a configuration into a device. The return value of the function (i.e., if non-zero) may identify that the function successfully imported a configuration, or may (i.e., if a zero value) indicate that the function did not successfully import the configuration. As such, the following code may be generated:

RETURN_VALUE=import_scp(<arguments>)
IF RETURN_VALUE=0:
RETURN {COMMAND FAILED}
IF RETURN_VALUE not equals 0:
RETURN {COMMAND SUCCEEDED, MODIFIED}

In the example code above, the capitals may be replaced with the syntax that is applicable for that DevOps application.

In some embodiments, the nouns, noun combinations, and verbs in a domain-specific dictionary included in the linguistic semantic analysis database(s) 208 may be used to identify a set of instructions. For example, a set of API instructions may include "export_server_configuration_profile share=//share/user.xml creds=user". If the set of API instructions are unrecognizable, they may be provided to the linguistic semantic analysis engine 204, which will parse the set of API instructions in order to identify the API terms and match then to the application-specific programming language terms substantially as discussed above. The linguistic semantic analysis engine 204 may then use code reflection to invoke an API according to the set of API instructions that were matched to the application-specific programming language terms. In addition, a return status value may be retrieved, and using direction information in the linguistic semantic analysis database(s) 208, the return status for the API may be determined.

In some embodiments, the linguistic semantic analysis engine 204 may parse modules and analyze methods and properties in the module to determine whether objects are returned by those methods and properties, and/or how objects are modified by those methods and properties. In a specific example, a "getter" method (e.g., a get method, a find method, a list method, etc.) returns values (or properties are associated with return values) from the library module 210*a*/314, while a "setter" method returns values that are associated with changed properties that indicate whether the return value was modified in the domain/target system/computing device.

In an embodiment, the following code may be generated for a getter:
VALUE=idrac.get_boot_mode( )
RETURN VALUE TO DEVOPS In an embodiment, the following code may be generated for a setter:
RETURN_VALUE=idrac.set_boot_mode(<VALUE_FROM_DEVOPS>)
IF RETURN_VALUE=0:
RETURN {COMMAND FAILED}
IF RETURN_VALUE not equals 0:
RETURN {COMMAND SUCCEEDED, MODIFIED}

In an embodiment, the following code may be generated for a constructor:
RETURN_VALUE=idrac.create_virtual_drive(<VALUE_FROM_DEVOPS>)
IF RETURN_VALUE=0:
RETURN {COMMAND FAILED}
IF RETURN_VALUE not equals 0:
RETURN {COMMAND SUCCEEDED, CREATED}

In an embodiment, the following code may be generated for a destructor:
RETURN_VALUE=idrac.remove_virtual_drive(<VALUE_FROM_DEVOPS>)
IF RETURN_VALUE=0:
RETURN {COMMAND FAILED}
IF RETURN_VALUE not equals 0:
RETURN {COMMAND SUCCEEDED, DELETED}

In such an example, the linguistic semantic analysis engine 204 may interpret valid return values as successful executions of the API, and may interpret invalid return values as unsuccessful executions of the API. Furthermore, the linguistic semantic analysis engine 204 may only execute methods tagged as "login", "logout", "connect", and "disconnect" once.

In some embodiments, the linguistic semantic analysis engine 204 may APIs provided by modules, and if those APIs are incomplete, an API completeness notification may be provided to a user. For example, the linguistic semantic analysis engine 204 may determine whether expected combinations of verbs for particular nouns identified in an API are present. In a specific example, if "import SCP" is present in an API and "export SCP" is not present in that API, the linguistic semantic analysis engine 204 may provide a notification to a user of the server system 200. In another example, if an API provides the ability to export a RAID configuration, but an iDRAC or other system is not present, the linguistic semantic analysis engine 204 may provide a notification to a user of the server system 200. In an embodiment, these features may be identifies by analyzing the verb thesaurus. For example, a library may only implement the following functions:
a. Create_virtual_drive( )
b. Remove_virtual_drive( )
c. Import_SCP( )

Analysis of the thesaurus as discussed above provides that, for a Virtual Drive, "create" and "remove" (at least one synonym and one antonym) are defined in the library. However, for "import_SCP", there is no corresponding antonym found (export_SCP), and may be identified as missing functionality.

Thus, systems and methods have been described that provide for the integration of modules into devops applications via the use of linguistic semantic analysis of dictionaries, the application, the module, and/or other information sources to identify the semantics utilized in the domain/target system in order to map the module with content awareness into the application. The systems and methods of the present disclosure eliminate the need for "hand-coding" and associated maintenance of modules that is necessary for integration and to keep the applications up-to-date with regard to their operation in the domain/target system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A linguistic semantic analysis application integration system, comprising:
a memory device storing an application;
at least one storage device storing one or more linguistic semantic analysis databases that include application-specific programming language information that identifies application-specific programming language terms utilized in providing the application;
a module for utilization by the application; and
a linguistic semantic analysis engine that is coupled to the memory device, the at least one storage device, and the module, wherein the linguistic semantic analysis engine is configured to:
analyze the module to determine methods and properties included in the module;
parse the methods and properties to identify library programming language terms included in the methods and properties;
match the library programming language terms included in the methods and properties with the application-specific programming language terms included in the application-specific programming language information;
determine, based on the matching of the library programming language terms with the application-specific programming language terms, intent for the methods and properties by analyzing the methods and properties to identify one or more modifiers that are included in the methods and properties and that are configured to modify objects to produce modified objects; and
automatically generate, based on the determination of the intent for the methods and properties, integration code for integrating the module with the application.

2. The system of claim 1, wherein the one or more linguistic semantic analysis databases include computing device information that identifies components in a computing device that is configured to execute the application, and wherein the linguistic semantic analysis engine is configured to:
    determine, based on the matching of the library programming language terms with the application-specific programming language terms and using the computing device information, the intent for the methods and properties.

3. The system of claim 1, wherein the library programming language terms include programming language nouns, programming language verbs, programming language synonyms, programming language antonyms, and programming language acronyms.

4. The system of claim 1, wherein the one or more linguistic semantic analysis databases include resource information that identifies computing device resources accessed by the application, and wherein the linguistic semantic analysis engine is configured to:
    determine, based on the matching of the library programming language terms with the application-specific programming language terms and using the resource information, the intent for the methods and properties.

5. The system of claim 1, wherein
    the determining the intent for the methods and properties includes analyzing the methods and properties to identify one or more getters that are included in the methods and properties and that are configured to return objects, and wherein the linguistic semantic analysis engine is configured to:
    automatically generate, based on the determination of the intent for the methods and properties, integration code for integrating the module with the application.

6. The system of claim 1, wherein the linguistic semantic analysis engine is configured to:
    parse the module; and
    tag the methods and properties included in the module that access system resources.

7. The system of claim 1, wherein the linguistic semantic analysis engine is configured to:
    analyze Application Programming Interfaces (APIs) provided by the module; and
    detect that the APIs are incomplete and, in response, provide an API incompleteness notification.

8. An Information Handling System (IHS), comprising:
    a processing system;
    a memory system that is coupled to the processing system and that includes instructions that, when executed by the processing system, cause the processing system to provide a linguistic semantic analysis engine that is configured to:
        analyze a module that is to be utilized with an application;
        determine, based on analyzing of the module, methods and properties included in the module;
        parse the methods and properties to identify library programming language terms included in the methods and properties;
        match the library programming language terms included in the methods and properties with application-specific programming language terms that are included in application-specific programming language information that is stored in one or more linguistic semantic analysis databases;
        determine, based on the matching of the library programming language terms with the application-specific programming language terms, intent for the methods and properties by analyzing the methods and properties included in the module to identify one or more getters that are configured to return objects; and
        automatically generate, based on the determination of the intent for the methods and properties, integration code for integrating the module with the application.

9. The IHS of claim 8, wherein the linguistic semantic analysis engine is configured to:
    determine, based on the matching of the library programming language terms with the application-specific programming language terms and using computing device information that identifies components in a computing device that is configured to execute the application, the intent for the methods and properties.

10. The IHS of claim 8, wherein the library programming language terms include programming language nouns, programming language verbs, programming language synonyms, programming language antonyms, and programming language acronyms.

11. The IHS of claim 8, wherein the linguistic semantic analysis engine is configured to:
    determine, based on the matching of the library programming language terms with the application-specific programming language terms and using resource information that identifies computing device resources accessed by the application, the intent for the methods and properties.

12. The IHS of claim 8, wherein
    the determining the intent for the methods and properties includes analyzing the methods and properties to identify one or more modifiers that are included in the methods and properties and that are configured to modify objects to produce modified objects, and wherein the linguistic semantic analysis engine is configured to:
    automatically generate, based on the determination of the intent for the methods and properties, integration code for integrating the module with the application.

13. The IHS of claim 8, wherein the linguistic semantic analysis engine is configured to:
    analyze Application Programming Interfaces (APIs) provided by the module; and
    detect that the APIs are incomplete and, in response, provide an API incompleteness notification.

14. A method for integrating applications using linguistic semantic analysis, comprising:
    analyzing, by a linguistic semantic analysis system, a module that is to be utilized with an application;
    determining, by the linguistic semantic analysis system based on analyzing of the module, methods and properties included in the module;
    parsing, by the linguistic semantic analysis system, the methods and properties to identify library programming language terms included in the methods and properties;
    matching, by the linguistic semantic analysis system, the library programming language terms included in the methods and properties with application-specific programming language terms that are included in application-specific programming language information that is stored in one or more linguistic semantic analysis databases;
    determining, by the linguistic semantic analysis system based on the matching of the library programming language terms with the application-specific programming language terms, intent for the methods and properties;

automatically generating, by the linguistic semantic analysis system based on the determination of the intent for the methods and properties, integration code for integrating the module with the application;

analyzing, by the linguistic semantic analysis system, Application Programming Interfaces (APIs) provided by the module; and detecting, by the linguistic semantic analysis system, that the APIs are incomplete and, in response, providing an API incompleteness notification.

15. The method of claim 14, further comprising:

determining, by the linguistic semantic analysis system based on the matching of the library programming language terms with the application-specific programming language terms and using computing device information that identifies components in a computing device that is configured to execute the application, the intent for the methods and properties.

16. The method of claim 14, wherein the library programming language terms include programming language nouns, programming language verbs, programming language synonyms, programming language antonyms, and programming language acronyms.

17. The method of claim 14, further comprising:

determining, by the linguistic semantic analysis system based on the matching of the library programming language terms with the application-specific programming language terms and using resource information that identifies computing device resources accessed by the application, the intent for the methods and properties.

18. The method of claim 14, further comprising:

parsing, by the linguistic semantic analysis system, the module;

analyzing, by the linguistic semantic analysis system, the methods and properties included in the module to determine modified objects that are modified by the methods and properties; and analyzing, by the linguistic semantic analysis system, the methods and properties included in the module to determine returned objects that are returned by the methods and properties.

19. The method of claim 14, further comprising:

parsing, by the linguistic semantic analysis system, the module; and tagging, by the linguistic semantic analysis system, the methods and properties included in the module that access system resources.

\* \* \* \* \*